Jan. 14, 1964 E. K. CABLE 3,118,102
DIODE RECTIFIER WITH OVERVOLTAGE PROTECTION
Filed Dec. 14, 1960
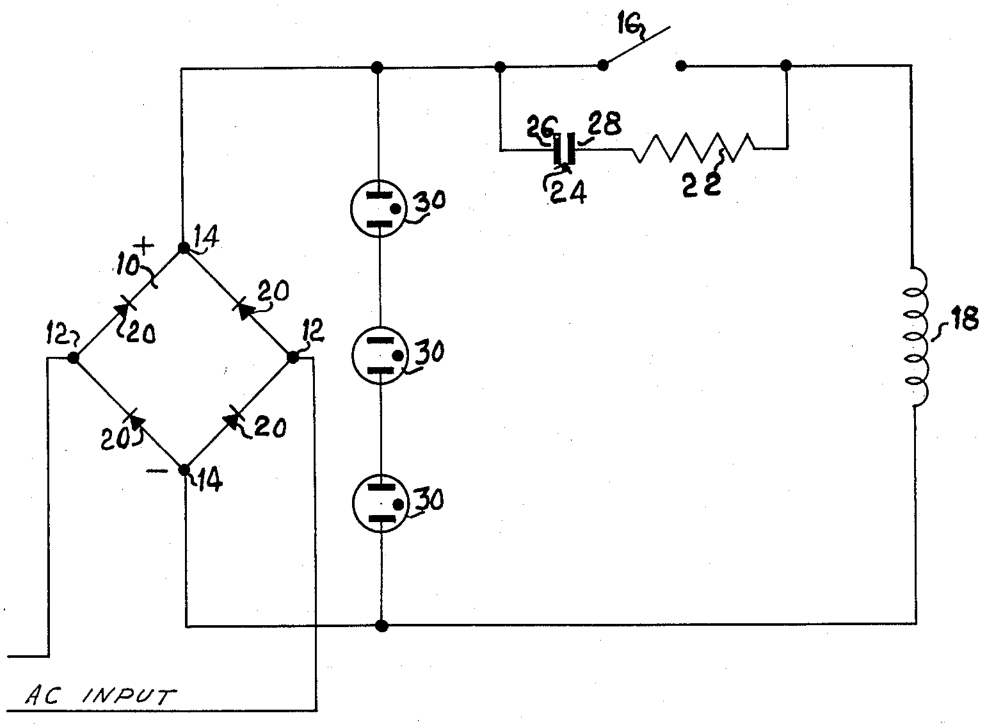
INVENTOR.
Elvin K. Cable
BY Dybvig and Dybvig
HIS ATTORNEYS United States Patent Office 3,118,102
Patented Jan. 14, 1964

3,118,102

DIODE RECTIFIER WITH OVERVOLTAGE PROTECTION

Elvin K. Cable, New Carlisle, Ohio, assignor to Ledex, Inc., Dayton, Ohio, a corporation of Ohio Filed Dec. 14, 1960, Ser. No. 75,827
5 Claims. (Cl. 321—11)

This invention relates to a diode rectifier with an overvoltage protection device and more particularly relates to a diode rectifier for use in a circuit including an inductive element.

It is often desirable to pass unidirectional or direct current through an inductive load such as the coil of a solenoid actuator unit, the current being obtained from an alternating current source. One convenient method of converting alternating current to unidirectional current is to connect the alternating current source to the input terminals of a device known as a rectifier bridge and connect the output terminals of the bridge to the load. The rectifier bridge may be made from a plurality of diodes so arranged that one output terminal of the bridge is constantly at a higher potential than the other output terminal of the bridge. When the two output terminals of the rectifier bridge are connected by a circuit, a current is produced which by convention is said to pass from the bridge output terminal of higher potential to the bridge output terminal of lower potential. The rectifier bridge thus may be thought of as a seat of electromotive force for a unidirectional or direct current.

Numerous types of diodes may be used in a rectifier bridge. In the past, metallic diodes or rectifiers such as selenium diodes and copper oxide diodes have been used with success. Recently, a new type of diode, known as a silicon diode has been introduced. Silicon diodes are considerably smaller in size than the selenium or copper oxide diodes. It is often desirable or necessary to use the smallest circuit components available. For this reason, silicon diodes have replaced the selenium or copper oxide diodes in many circuit applications.

However, it has not been possible satisfactorily to substitute the smaller silicon diodes for the copper oxide or selenium diodes in a bridge network where the output terminals of the network are connected to a circuit having a large inductive element if there is also an arc suppressed switch in the circuit between the bridge and the inductive element. The reason for this will be made more apparent later. Briefly, when the switch in the circuit is opened, the inductance in the circuit produces a surge current and voltage which reach the output terminals of the bridge. The voltage induced by the inductive element can ultimately appear at the condenser as a voltage opposed to the output voltage of the bridge. Thus, an inverse current and voltage may be impressed upon the bridge. Selenium and copper oxide diodes can withstand a comparatively large inverse voltage. However, silicon diodes can tolerate only comparatively small inverse voltages. The voltage induced in the circuit by the inductive element may be several times higher than the normal output of the bridge and may be considerably higher than that which the silicon diodes can tolerate.

Accordingly, an object of this invention is to provide, for use in a circuit having an inductive element, a silicon diode bridge rectifier and circuit means to minimize the inverse voltage impressed upon the rectifier due to the voltage induced by the element.

Other objects and advantages reside in the construction of parts, the combination thereof, the method of manufacture and the mode of operation, as will become more apparent from the following description.

Referring to the drawings,

The figure is a schematic view of a circuit embodying the instant invention.

More particularly referring to the figure, the circuit includes a rectifier bridge 10 having input terminals 12 and output terminals 14. The input terminals 12 may be connected to a suitable source of alternating voltage, as illustrated. The output terminals 14 are connected through a circuit including an interrupter switch 16 to an inductive load indicated at 18. By convention, the current is thought of as passing from the positive output terminal 14 through the load 18 to the negative output terminal 14. Within the bridge 10, the current passes only in the direction of the arrows symbolizing each of the diodes which are designated 20.

The circuit thus described may be, for example, the circuit used to repeatedly energize a solenoid actuator, such as that described in U.S. Patent Number 2,501,950, wherein the inductive load 18 comprises the solenoid coil. In use, the interrupter switch 16 may be repeatedly opened and closed whereupon the armature (not shown) of the solenoid actuator is intermittently energized.

As is well known to those skilled in the art, circuit elements displaying inductive properties tend to resist a change in current. The explanation for this is that a magnetic field surrounds an inductive element when current passes therethrough. When the current changes, the magnetic field must also change. The change in the magnetic field thereby induces a voltage opposing the change in current. Thus, when the switch 16 is first closed, the increase in current in the circuit produces an expanding magnetic field surrounding the inductive load 18. The expanding field in turn induces a voltage opposing the increasing current. The induced voltage, however, rapidly diminishes and the coil approaches a steady state in which it is surrounded by a non-varying magnetic field. When the switch 16 is thereafter opened, the current supplied from the rectifier 10 is cut off. This causes a rapid decrease in current flowing to the inductive element whereupon the magnetic field surrounding the inductive load collapses. The collapsing field induces a voltage in the inductive element opposing the decrease in current. Therefore, when the switch 16 is opened, an induced voltage produces a surge current in the same direction as the current initially produced by the bridge.

Because the voltage induced by the inductive load 18 is added to the voltage produced by the rectifier 10, a relatively high difference in potential is produced at the terminals of the switch 16 before the switch terminals are fully open. The high voltage across the closely spaced terminals causes the air adjacent the terminals to ionize, thus producing sparking or arcing. Once arcing occurs, voltage peaks or spikes of five hundred volts or more are produced by the rapidly collapsing magnetic field surrounding the inductive load. Sparking or arcing at the switch terminals, in addition to presenting a fire hazard, is destructive of the terminals and considerably reduces the life of the switch. For this reason, it has become accepted practice to provide a device known as an arc suppressor across the switch terminals which may, as in the instant embodiment include a resistor, designated 22, and capacitor, designated 24.

The flow of current with the arc suppressor 22, 24 across the terminals of the switch 16 is slightly different from that described above. When the switch 16 is closed, the arc suppressor is shunted and current obviously will not pass therethrough. Accordingly, the arc suppressor does not alter the operation of the circuit when the switch 16 is closed. However, when the switch 16 is opened, the surge current produced by the inductive load 18 causes a build-up of charge on the plates of the capacitor 24. Thus, the surge current produced by the inductive load 18 when the switch 16 is initially opened passes through the circuit wires in the same direction as the bridge output current and through the rectifier bridge 10. As a result, the plate of the capacitor 24 designated 26 becomes positively charged and the plate designated 28 becomes negatively charged. The charging of the capacitor plates occurs rapidly after the switch 16 is opened. However, the build-up of voltage across the capacitor, and accordingly the switch 16, is retarded by the capacitor 24 and the resistor 22. Therefore, the switch terminals will be fully separated before a voltage sufficient to cause arcing is impressed across the terminals. Once the terminals are fully separated, their relative spacing is sufficiently large to prevent arcing.

While the capacitor aids in suppressing arcing at the switch terminals, it may be destructive of the rectifier diodes 20. When the switch 16 is opened, the charges accumulated on the capacitor will attempt to dissipate by flowing from the positively charged plate 26 back through the rectifier diodes 20 and the load 18 to the negatively charged plate 28. Thus, a high inverse voltage is impressed upon the output terminals 14 of the bridge 10. If the diodes 20 were selenium or copper oxide diodes, which can tolerate a large inverse voltage, the charge upon the capacitor can dissipate harmlessly by leakage through the diodes. Silicon diodes, however, readily fail when subjected to the large inverse voltages encountered in a circuit such as this.

In accordince with this invention, however, it is possible to use the smaller and thus more desirable silicon diodes at 20 by minimizing the inverse voltage produced at the output terminals 14 of the rectifier 10. This is accomplished by placing conducting means including a plurality of gas discharge tubes 30 across the output terminals 14 of the rectifier 10, that is in parallel with the rectifier 10. Gas discharge tubes display the property of being substantially infinite resistors at low voltages. But, when a predetermined higher voltage is impressed across the plates of the gas diodes, the gas within the discharge tubes ionizes. Upon ionization of the gas, current passes freely through the tubes. The resistance of the tubes thus becomes practically negligible. In the instant embodiment of the invention, three gas tubes 30 are utilized. These do not become conductive, that is do not ionize, until a potential is impressed across the current conducting means which is considerably higher than the output voltage of the rectifier 10. Accordingly, when the switch 16 is closed, current moves through the circuit as described above without passing through the discharge tubes 30 due to their high resistance. However, at the instant the switch 16 is opened and the capacitor 24 becomes charged, the induced voltage spike or peak is sufficient to cause the gas within the tubes 30 to ionize, whereupon the tubes become conductive. The charge on the capacitor 24 is then dissipated through the tubes 30, the tubes 30 providing a current path passing from the positive capacitor plate 26 through the tubes 30 to the negatively charged plate 28. Since the resistance provided by the tubes 30 when voltage spikes are present is small, very little inverse voltage is impressed on the diodes 20. Rather, while the tubes 30 are conducting, they act as a shunt or short circuit for the rectifier. Accordingly, the current issuing from the positive terminal 14 of the bridge goes through the tubes 30 to the negative terminal of the bridge. In this way, the silicon diodes used in the bridge are completely protected from the voltage spikes or peaks. The gas tubes 30 are so chosen that they deionize at a potential greater than the maximum potential of the bridge output. Otherwise, the tubes 30 would constantly short circuit the rectifier 10.

While the presently preferred embodiment of the invention, illustrated in the drawing, utilizes three gas discharge tubes 30 in series across the terminals 14, it will be apparent to those skilled in the art that the number of discharge tubes 30 depends upon the nature of the discharge tubes and the voltages encountered. The basic requirements for the tubes 30 are that they do not ionize at a voltage as low as the maximum output voltage of the bridge, that they ionize at a voltage lower than an inverse voltage which would be destructive of the silicon diodes 20, and that once ionized, they will deionize at a voltage exceeding the maximum output voltage of the rectifier bridge 10.

As a practical illustration, the circuit shown in the figure was used to drive a "Ledex" rotary solenoid, Model No. 5S, having a coil of 1,974 turns of 32 AWG wire. Model X5A2 silicon diodes manufactured by the International Rectifier Company were used in the bridge network. The input terminals 12 of the rectifier bridge network 10 were connected to a source of 115 volt alternating current. The average direct current output voltage of the rectifier 10 under such circumstances is approximately 100 volts. The arc suppressor capacitor 24 was rated at 0.10 microfarad at 600 volts or more and was placed in series with a resistor 22 rated at 10 ohms, 2 watts. When the circuit just described was used without the gas discharge tubes 30, it was found that the X5A2 silicon diodes were destroyed after the interrupter switch 16 had been operated just a few times. However, by placing three gas discharge tubes 30 across the output terminals 14 of the rectifier 10, the life of the rectifier 10 was increased to that of rectifiers employing selenium or copper oxide diodes.

In the circuit described above, the type of discharge tubes used were neon glow tubes or lamps manufactured by the General Electric Company, designated "NE 83." These glow tubes each have an ionization voltage of approximately 65 to 70 volts. The three are connected in series as shown in the figure. In series they ionize at approximately 200 volts and de-ionize at approximately 180 volts. When the circuit is placed in operation with the neon glow tubes across the output terminals 14, each time the switch 16 is opened, the glow tubes 30 will glow substantially instantaneously and then immediately cease glowing.

It might be thought that only two "NE 83" neon glow tubes would be necessary in the circuit described above, since two "NE 83" glow tubes in series would have an ionization voltage of approximately 135 volts and a deionization voltage of approximately 120 volts. However, a 115 volt alternating current has a maximum voltage of 160 volts, since the 115 volt rating is only the "root-mean-square" value of the voltage, as is well known in the art. At these times when the switch 16 is closed, the 150 to 160 volt maximum voltage produced by the bridge is not maintained over a sufficient time interval to initiate ionization of two "NE 83" tubes. However, when the switch 16 is open, the capacitor 24 is in the circuit and will charge to a steady state voltage sufficient to ionize two glow tubes (135 volts). This ionization will persist until the switch is closed. Thus, with two glow tubes, they ionize whenever the switch 24 is open. In contrast, with three glow tubes, there is ionization only when necessary to dissipate an overvoltage and then only for a time sufficient to dissipate the overvoltage. Considering that the life of a glow tube is governed by the ionization time, there is a definite advantage in employing three glow tubes rather than two.

By practicing the invention described above, a dramatic saving in space is provided. Four silicon diodes and three "NE 83" neon glow tubes may be packaged together and potted if desired. The rectifier package so formed is considerably smaller than the size of comparable prior art rectifier packages comprising four selenium or copper oxide diodes. Thus, even though one or more gas discharge tubes are required in addition to the silicon diodes, the dimensions of the resulting rectifier package are smaller than packages available in the past.

Although the presently preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. Apparatus for supplying an inductive load with unidirectional current from an alternating current source comprising, in combination:

a rectifier comprising a bridge of silicon diodes, said bridge having input and output terminals, the input terminals being adapted to be connected across an alternating voltage source to produce a unidirectional voltage at the output terminals of the rectifier;

circuit means between said output terminals and said load for delivering the voltage produced at said output terminals to said load, said circiut means including a switch and a capacitor connected across the switch, said capacitor serving to suppress the arc which otherwise would be produced at the switch terminals by the induced voltage generated by the inductive load when the switch is opened; and current conducting means for minimizing the inverse voltage impressed on the diodes when the switch is opened, said current conducting means including at least one gas discharge tube connected in the circuit means in parallel with the rectifier and having the characteristic that it does not conduct when only the maximum output voltage of the rectifier is present across the conducting means while the switch is closed, but becomes conductive when voltage spikes are present across the conducting means immediately after the switch is opened.

2. The combination of claim 1 wherein said current conducting means comprises a plurality of gas discharge tubes connected together in series across the output terminals of the bridge.

3. The combination comprising:

a rectifier comprising a bridge of silicon diodes, said rectifier having input and output terminals, the input terminals being adapted to be connected across an alternating voltage source to produce a unidirectional voltage at the output terminals;

circuit means connected between said output terminals including an inductive element and a switch arranged in series relation with a capacitor connected across the switch, said capacitor serving to suppress the arc which otherwise would be produced at the switch terminals by the induced voltage generated by the inductive element when the switch is opened; and a discharge path connected in said circuit means in parallel with the rectifier, said path including at least one gas discharge tube which does not conduct when just the rectifier output voltage is impressed across said path, but which becomes conductive when a voltage is impressed across the path induced in the circuit by the inductive element, and once conductive, becomes non-conductive at a voltage across the path greater than the maxium output voltage of the rectifier.

4. The combination of claim 3 wherein the said discharge path includes a plurality of gas discharge tubes connected in series.

5. In combination:

a rectifier bridge having a plurality of silicon diodes, said bridge having input terminals adapted to be connected to a source of alternating voltage and output terminals adapted to be connected to a series circuit containing an inductive element and a switch with a capacitor across the switch; and a discharge path connected across the output terminals of the bridge including at least one gas discharge tube which ionizes and de-ionizes only when voltages greater than the maximum output voltage of the rectifier bridge are impressed across the output terminals of the bridge.

References Cited in the file of this patent

UNITED STATES PATENTS

| | | |
|---|---|---|
| 2,395,116 | Grandstaff | Feb. 19, 1946 |
| 2,714,702 | Shockley | Aug. 2, 1955 |
| 2,770,765 | Negus | Nov. 13, 1956 |
| 2,811,675 | McGee et al. | Oct. 29, 1957 |

FOREIGN PATENTS

| | | |
|---|---|---|
| 588,204 | Germany | Nov. 14, 1933 |